July 12, 1927.

R. S. HISLOP

CANDY MAKING MACHINE

Filed Nov. 23, 1922   3 Sheets-Sheet 1

Inventor:
Robert S. Hislop
By Macleod, Calver, Copeland & Dike
Attorneys.

July 12, 1927.  
R. S. HISLOP  
CANDY MAKING MACHINE  
Filed Nov. 23, 1922  
1,635,713  
3 Sheets-Sheet 3

Inventor:
Robert S. Hislop.
By Macleod, Calvert, Copeland & Dike.
Attorney.

Patented July 12, 1927.

1,635,713

UNITED STATES PATENT OFFICE

ROBERT S. HISLOP, OF RACINE, WISCONSIN, ASSIGNOR TO RACINE CONFECTIONERS MACHINERY COMPANY, OF RACINE, WISCONSIN, A CORPORATION OF WISCONSIN.

CANDY-MAKING MACHINE.

Application filed November 23, 1922. Serial No. 602,764.

This invention relates to candy making machines, and especially to machines of the general type shown in Letters Patent No. 971,097, issued September 27, 1910, to Frank H. Woolf, wherein is shown and described a machine for forming that class of confectionery known in the trade as "suckers" and comprising tablets of candy on small sticks.

The present invention has for its objects to provide a machine which is capable of rapid operation, and a correspondingly high rate of production, and which may be run continuously instead of intermittently as in said prior patent; to provide improved means for supplying and handling the sticks which are assembled with the candy tablets; to provide a construction wherein candy tablets may be automatically applied to both ends of each stick, so as to form what are known in the trade as "dumb-bells"; and also to provide a machine of this character so constructed and provided with interchangeable parts as to render the same readily adaptable to the manufacture of numerous other kinds of candies besides those specifically referred to and in which sticks are not employed.

The foregoing and other objects of the invention, together with means whereby the same may be carried into effect, will best be understood from the following description of one form or embodiment thereof illustrated in the accompanying drawings. It will be understood, however, that the particular constructions and adaptations described and shown have been chosen for illustrative purposes merely, and that the invention, as defined by the claims hereunto appended, may be otherwise practiced without departure from its spirit or scope.

Figure 2:
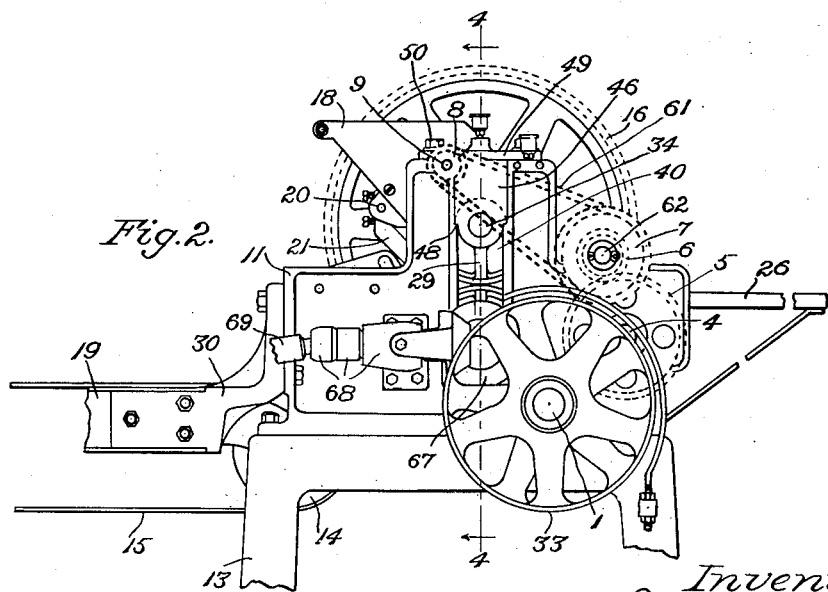
Fig. 2 is a side elevation looking toward the side appearing at the bottom in Fig. 1.
Figure 5:
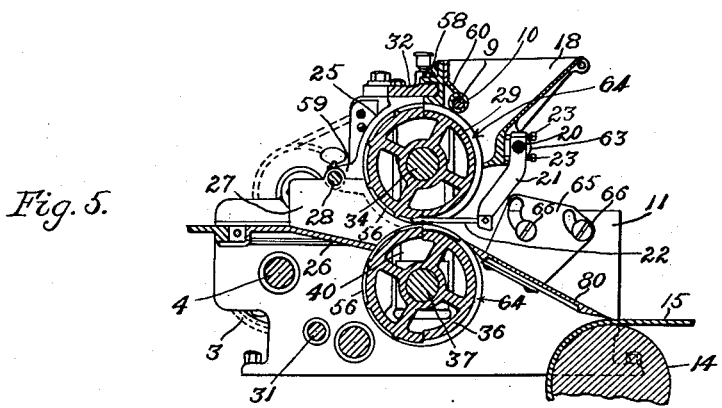
Fig. 5 is a longitudinal section taken substantially on the line 5—5, Fig. 1.

The machine frame comprises a pair of spaced parallel uprights 11 and 12 mounted on suitable supports 13 in which is journalled one of the rollers 14 (Figs. 2 and 5) for the conveyor belt 15 which carries away the candies as they are formed, as more fully explained in Letters Patent No. 971,097, above referred to. The conveyor 15 operates in a suitable frame comprising side members 19 supported at their ends adjacent the machine by brackets 30 secured to the frame members 11 and 12. Said frame members are connected and braced by one or more transverse bars 31 (Fig. 5) and by a transverse, H-shaped cap 32 at the top of said members.

Figure 3:
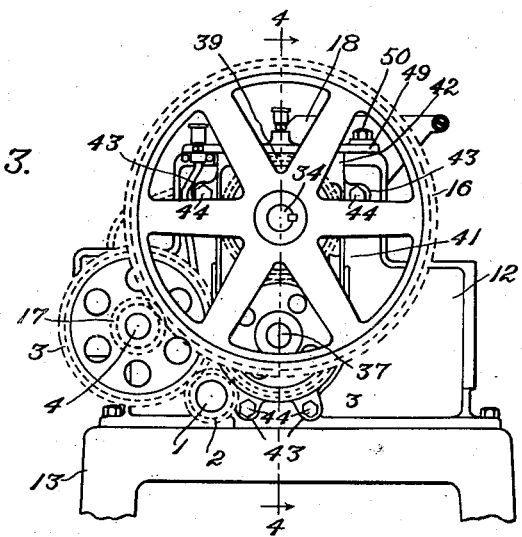
Fig. 3 is a side elevation looking toward the side opposite that shown in Fig. 2.
Figure 4:
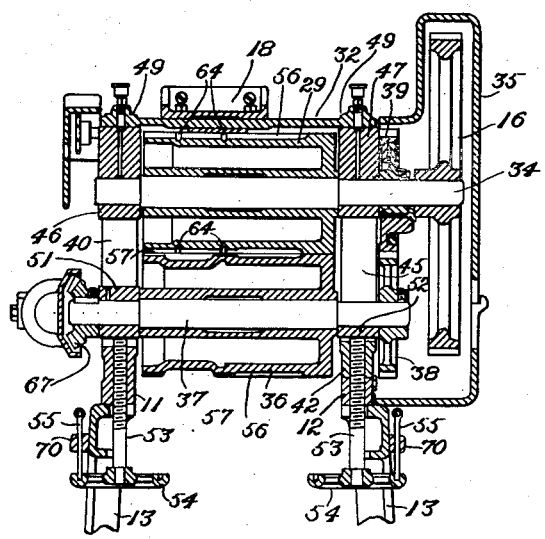
Fig. 4 is a transverse section taken substantially on the lines 4—4, Figs. 1, 2 and 3.

Journalled in the frame above described is a transverse driving shaft 1 having at one end fast and loose pulleys 33 and carrying at its opposite end a pinion 2 meshing with a gear 3 on a second transverse shaft 4 parallel to the driving shaft 1. The shaft 4 has fast thereon, adjacent the gear 3, a pinion 17 which meshes with a gear 16 on the shaft 34 of the upper molding roll 29, said gear 16 being preferably enclosed by a suitable detachable casing 35, shown in Fig. 4 but omitted in the other figures for the sake of clearness. The top molding roll 29 cooperates with a lower molding roll 36 carried by a shaft 37 parallel with the shaft 34, said shafts being connected for rotation in unison in opposite directions by gears 38 and 39, one of which is preferably angularly adjustable to permit said rolls to be relatively adjusted so as to bring the forming surfaces thereof into accurate register. The shaft 37 of the lower molding roll is connected, through bevel gears 67 and a universal joint 68 with a shaft 69 for operating the conveyor belt 15. The connections between said shaft and belt are not shown herein as they form no portion of the present invention. The frame members 11 and 12 are formed with vertical openings 40 and 41, respectively, extending downwardly from the tops thereof, the opening 40 being relatively narrow and the opening 41 being of a width substantially equal to or slightly greater than the diameter of the rolls 29 and 36. Located in the vertical opening 41 of the frame member 12 is a substantially U-shaped yoke 42 (Figs. 3, 4 and 7) having lugs 43 which are detachably secured by screws 44 to the outer side of the member 12. The yoke 42 is formed with a vertical opening 45 corresponding to the opening 40 in the frame 11 and in alinement therewith transversely of the machine. The shaft 34 is journalled in bearings 46 and 47 located respectively in the openings 40 and 45, said bearings being formed with shoulders 48 (Fig. 2) which are supported on corresponding shoulders at the edges of said openings and are secured in position by the end legs 49 of the H-shaped cap 32 which are detachably secured to the top of the frame uprights by screws 50. The shaft 37 is journalled at one end in a bearing 51 located in the opening 40 in the upright 11 and at the opposite end in a bearing 52 located in the opening 45 in the yoke 42. The bearings 51 and 52 are vertically adjustable, to space the lower roll 36 with respect to the upper roll 29, by means of jackscrews 53 (Fig. 4) in threaded engagement with the lower ends of the frame members 11 and 12 and with the lower end of the yoke 42, said jackscrews being provided with hand wheels 54 which may be locked in adjusted position by pins 55 sliding in lugs 70 on the supports 13.

The rolls 29 and 36 shown in Figures 1 to 5, inclusive, are designed for making ordinary suckers and to this end are formed with complementary molding cavities 56 to receive the plastic material and form the tablets therefrom and with longitudinal grooves 57 to receive sticks, said grooves communicating with said cavities. The plastic material is supplied to the rolls from a feed table 26 and is guided into position between feed guides 27 detachably carried by a rod 28 supported by the frame members, said guides being adjustable on said rod transversely of the machine in accordance with the requirements of the work. The sticks are supplied from a hopper 18 located above the rolls and secured by screws 58 to the cap 32, said hopper having an opening to receive the top roll 29, whereby the sticks are supplied to the grooves 57 thereof, as more fully explained in the prior patent above referred to, said sticks being retained in said grooves by a curved guard 25 enclosing one side of the roll and having a lug 59 secured to the rod 28. The sticks are prevented from jamming at the exit from the hopper 18 by means of a knurled roller 10 carried by a shaft 9 journalled in the frame and cooperative with a guard 60 secured to the interior of the hopper. The shaft 9 carries a sprocket 8 which is connected by a chain 61 with a sprocket 7 carried by the hub of a pinion 6 journalled on a stud 62 carried by the frame member 11, said pinion meshing with a gear 5 fast on the shaft 4 at the end thereof opposite the gear 3 and pinion 17.

The hopper 18 is formed with ears 63 in which is supported a rod 20 having hung thereon arms or brackets 21, the angular position of said brackets being accurately adjusted by means of abutment screws 23 carried thereby and engaging the adjacent wall of the hopper. The arms or brackets 21 carry at their ends fingers 22 which extend between the rolls, substantially tangentially thereof and are received in circumferential grooves 64 intersecting the longitudinal stick receiving grooves 57. The fingers 22 have pointed forward ends adapted, as the sticks are brought into engagement therewith, to press said sticks firmly into the tablets, the exact position being determined by adjustment of the arms 21 by the screws 23. The finished articles leaving the rolls are discharged upon the conveyor 15 by means of a chute 80 carried by brackets 65 which are secured to the uprights 11 and 12 by screws 66, said brackets being preferably formed with arcuate slots to receive said screws, whereby the exact position of the chute 64 may be varied.

Figure 1:
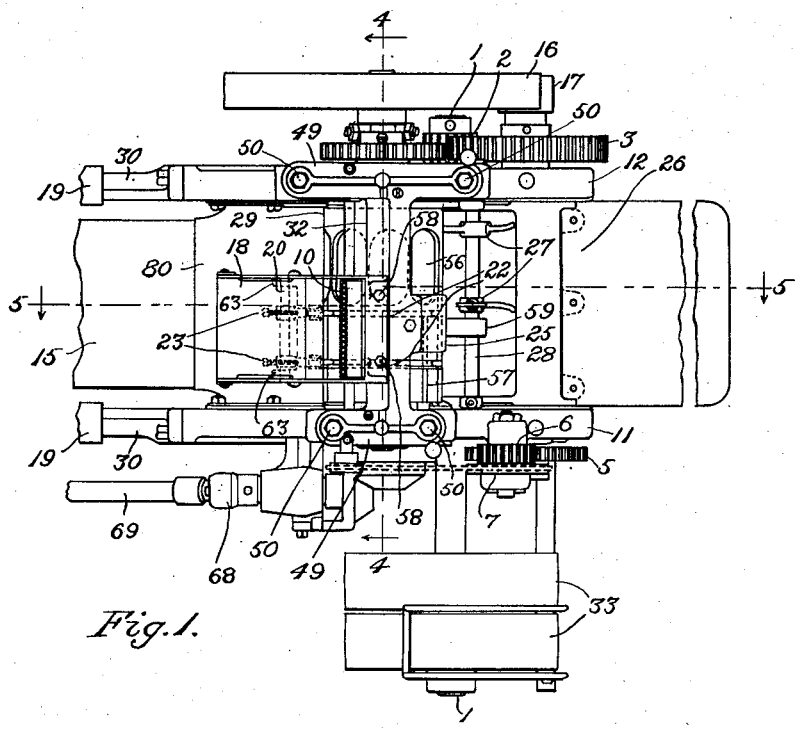
Fig. 1 is a plan view of the machine.
Figure 6:
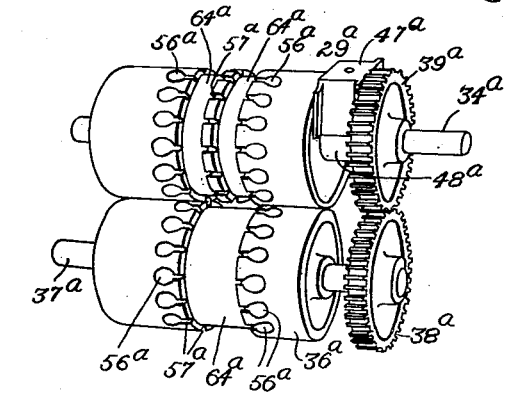
Figs. 6 and 7 are perspective views illustrating alternative sets of rolls which may be used interchangeably in the machine.

It will be seen that the means above described for applying the sticks to the tablets formed by the rolls is such as to permit said rolls to be constantly rotated, the power transmitting connections from the driving shaft 1 being such as to produce such continuous rotation. It will also be seen that the stick applying means does not depend for its operation upon the insertion of the sticks from the ends, as in the Woolf patent above referred to, so that by suitably forming the rolls 29 and 36 tablets may be applied to both ends of the sticks to form "dumb-bells". Thus, the rolls $29^b$ and $36^b$ in Figure 6 are provided with two circumferential series of tablet molding cavities $56^a$ and with longitudinal stick receiving grooves $57^a$ located respectively between adjacent cavities in the several series and communicating therewith. In the use of these rolls the stick hopper 18 is secured to the cap 32 at substantially the transverse center of the machine, instead of adjacent one side, as shown in Figure 1. The rolls $29^b$ and $36^b$ have circumferential grooves $64^a$ to receive the fingers 22, and the operation is as above described in connection with the "sucker" rolls 29 and 36.

Figure 7:
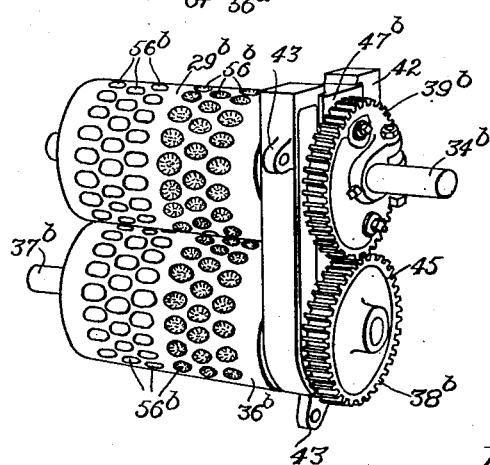

The U-shaped yoke 42 which is detachably secured to one side of the machine permits the rolls with their shafts and gears to be readily removed laterally from the machine, so that by changing the rolls, the machine can be arranged for the manufacture of either "dumb-bells" or ordinary "suckers". Moreover, as the machine runs constantly instead of intermittently, said machine is well adapted to the production of classes of goods other than "suckers" or "dumb-bells", and in Fig. 7 is shown a pair of rolls $29^b$ and $36^b$ having their surfaces suitably formed with recesses $56^b$ to produce two different varieties of hard candies, such as cough drops, fruit tablets, or the like. The showing in Fig. 7 is to be taken as illustrative merely of a type of rolls, since it will be obvious that rolls of substantially any known design can be used in this machine, and that by providing a suitable number of sets of interchangeable rolls, the machine can be easily and quickly adapted for the manufacture of many different kinds of goods, so that the same machine may be used for a wide variety of work.

The reference numerals employed in Figs. 6 and 7 are the same as those used to designate corresponding parts in Figs. 1 to 5 but with the exponent "a" added in Fig. 6 and the exponent "b" added in Fig. 7 wherever such parts are different from or other than those shown in said earlier figures.

Having thus described my invention, I claim:

1. In a candy machine, in combination, a pair of molding rolls, at least one of said rolls having mold cavities and at least one having stick receiving grooves, means for rotating said rolls, and means for supplying sticks to said grooves, said machine having provision for forcing said sticks into the material molded by said mold cavities by bodily movement of said sticks radial to one of said rolls.

2. In a candy machine, in combination, a pair of molding rolls, at least one of said rolls having mold cavities and at least one having stick receiving grooves, means for rotating said rolls, means for supplying sticks to said stick receiving grooves, and stationary means for forcing said sticks into the material in said mold cavities as said rolls are rotated.

3. In a candy machine, in combination, a pair of molding rolls, at least one of said rolls having mold cavities, and at least one having longitudinal stick receiving grooves and a circumferential groove intersecting said longitudinal grooves, means for rotating said rolls, means for supplying sticks to said stick receiving grooves, and means, including a tangentially disposed, stationary finger projecting into said circumferential groove, for forcing said sticks into the material in said mold cavities as said rolls are rotated.

4. In a candy machine, in combination, a pair of molding rolls, at least one of said rolls having mold cavities, and at least one having longitudinal grooves and a plurality of circumferential grooves intersecting said longitudinal grooves, means for rotating said rolls, means for supplying sticks to said longitudinal grooves, and tangentially disposed stationary fingers projecting into said circumferential grooves respectively between said rolls.

5. In a candy machine, in combination, molding rolls, at least one of said rolls having mold cavities, and at least one having longitudinal grooves and one or more circumferential grooves intersecting said longitudinal grooves, means for rotating said rolls, means for supplying sticks to said longitudinal grooves, and means, including stationary, adjustably mounted fingers projecting into said circumferential grooves, for forcing said sticks into the material in said mold cavities as said rolls are rotated.

6. In a candy machine, in combination, a frame, molding rolls mounted in said frame, said rolls having mold cavities, longitudinal grooves, and circumferential grooves intersecting said longitudinal grooves, means for rotating said rolls, a hopper on said frame for supplying sticks to said longitudinal grooves, arms pivoted to said hopper and having adjusting screws to fix their positions on their pivots, and fingers carried by said arms and projecting into said circumferential grooves.

7. In a candy machine, the combination with mechanism for feeding sticks and for molding material into tablet form, of stationary means rendered operative by the movement of said first-named mechanism for pressing said sticks into said tablets in a direction transverse to the lengths of said sticks.

8. In a candy machine, in combination, a receptacle to hold sticks, means for removing said sticks from said receptacle, other means coacting therewith for molding material into tablets, and stationary means rendered operative by the movement of said aforementioned means for pressing said sticks into said tablets in a direction transverse to the lengths of said sticks.

9. A candy machine comprising a frame, a pair of molding rolls, a detachable yoke, bearings for said rolls carried by said yoke, said yoke being insertable into and removable from said frame with said bearings and rolls, power-transmitting devices carried by said rolls and removable therewith, and means in said frame and cooperating with said power transmitting devices when said rolls are in place for rotating said rolls.

10. In a candy machine, a frame comprising spaced uprights having vertical openings extending downwardly from their tops, bearings in the opening in one of said uprights, a U-shaped yoke removably located in the opening in the other of said uprights, bearings in said yoke, and molding rolls journalled in said bearings.

11. In a candy machine, a frame, a stick hopper carried by the top of said frame, molding rolls in said frame below said hopper, means for rotating said rolls, and means for supporting said rolls in said frame and for permitting said rolls to be removed laterally therefrom.

In testimony whereof I affix my signature.

ROBERT S. HISLOP.